United States Patent
Kolych (10) Patent No.: US 12,248,836 B2
(45) Date of Patent: Mar. 11, 2025

(54) SYSTEMS, METHODS, AND DEVICES FOR WIRELESS DETECTION OF RADIO FREQUENCY IDENTIFICATION DEVICES

(71) Applicant: Cypress Semiconductor Corporation, San Jose, CA (US)

(72) Inventor: Igor Kolych, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/954,130

(22) Filed: Sep. 27, 2022

(65) Prior Publication Data

US 2024/0104316 A1    Mar. 28, 2024

(51) Int. Cl.
*G06K 7/10* (2006.01)
*H04W 88/06* (2009.01)

(52) U.S. Cl.
CPC ..... *G06K 7/10297* (2013.01); *G06K 7/10336* (2013.01); *H04W 88/06* (2013.01)

(58) Field of Classification Search
CPC ........... G06K 7/10297; G06K 7/10366; G06K 19/07766
USPC .................................... 235/462.46
See application file for complete search history.

(56) References Cited

U.S. PATENT DOCUMENTS

| | | | | |
|---|---|---|---|---|
| 7,205,931 B2* | 4/2007 | Gila | ...................... | G01S 13/348 342/194 |
| 11,502,728 B2* | 11/2022 | Gommé | ................... | H04B 5/73 |
| 2007/0001814 A1* | 1/2007 | Steinke | ................ | G06K 7/0008 340/10.31 |
| 2008/0143584 A1* | 6/2008 | Shoarinejad | .......... | G01S 13/751 342/127 |
| 2010/0109903 A1* | 5/2010 | Carrick | ................ | G06K 7/0008 340/8.1 |
| 2020/0034583 A1* | 1/2020 | Nikitin | ............... | G06K 7/10128 |
| 2022/0171950 A1* | 6/2022 | Bergman | ........... | G08B 13/2417 |

* cited by examiner

Primary Examiner — Ahshik Kim (57) ABSTRACT

Systems, methods, and devices detect radio frequency identification devices. Methods include transmitting a signal from a transmitter of a wireless device compatible with a wireless communications protocol, and receiving, using a receiver of the wireless device, a signal from a radio frequency identification (RFID) device, the signal comprising one or more resonance parameters. Methods also include generating sensing information and an estimated distance value based, at least in part, on the received signal, the sensing information representing a sensed condition at the RFID device, and the estimated distance value representing an estimate of a distance between the wireless device and the RFID device.

20 Claims, 10 Drawing Sheets

SYSTEMS, METHODS, AND DEVICES FOR WIRELESS DETECTION OF RADIO FREQUENCY IDENTIFICATION DEVICES

TECHNICAL FIELD

This disclosure generally relates to radio frequency identification devices, and more specifically, to wireless detection of chipless radio frequency identification devices that include sensing elements, such as sensors.

BACKGROUND

Radio frequency identification (RFID) devices may be configured to provide one or more identifiers using radio frequency (RF) signals. Such RFID devices may reflect RF signals to convey such identifiers via particular aspects of the backscattering of the signal. Scanning devices may receive such backscattered signals and extract identifying information from the backscattered signal. However, conventional scanning devices remain limited because they require single purpose scanners utilizing large ranges of frequencies of operation. Such scanners require additional hardware, resources, and cost. Accordingly, conventional scanning devices remain limited because they are not able to efficiently scan such chipless RFID devices that include sensing elements.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

RFID devices, may be configured to be compatible with dedicated RFID scanners that may include a waveform generator, a power splitter, and a transmission and reception antenna. Such RFID scanners are configured to RFID scanning, but do not support other functionalities. Accordingly, the use of such a dedicated scanner requires the implementation of separate and dedicated scanning equipment to scan RFID devices, thus increasing resource costs associated with RFID scanning. Moreover, such scanning equipment may be constrained by a particular range of operating frequencies. For example, scanning may be constrained to frequency bands of 2.4 GHz, 5 GHz, 6 GHz, or 7 GHz.

Embodiments disclosed herein scan RFID devices using transceivers included in a wireless device. More specifically, wireless devices that may be configured to perform wireless communications operations, such as data transmission and reception, and may also be configured to perform RFID scanning operations as well as one or more sensing and security operations, such as distance estimation. Moreover, wireless devices disclosed herein may be further configured to toggle between wireless communications and scanning functionalities. Accordingly, as will be discussed in greater detail below, wireless devices disclosed herein may be configured to transition between wireless communications and scanning and sensing functionalities to provide seamless implementation of both functionalities using existing collocated transceivers in the wireless device. Accordingly, such RFID scanning may be performed without the use of a dedicated scanner, thus reducing the resource costs associated with such scanning functionalities.

Figure 1:
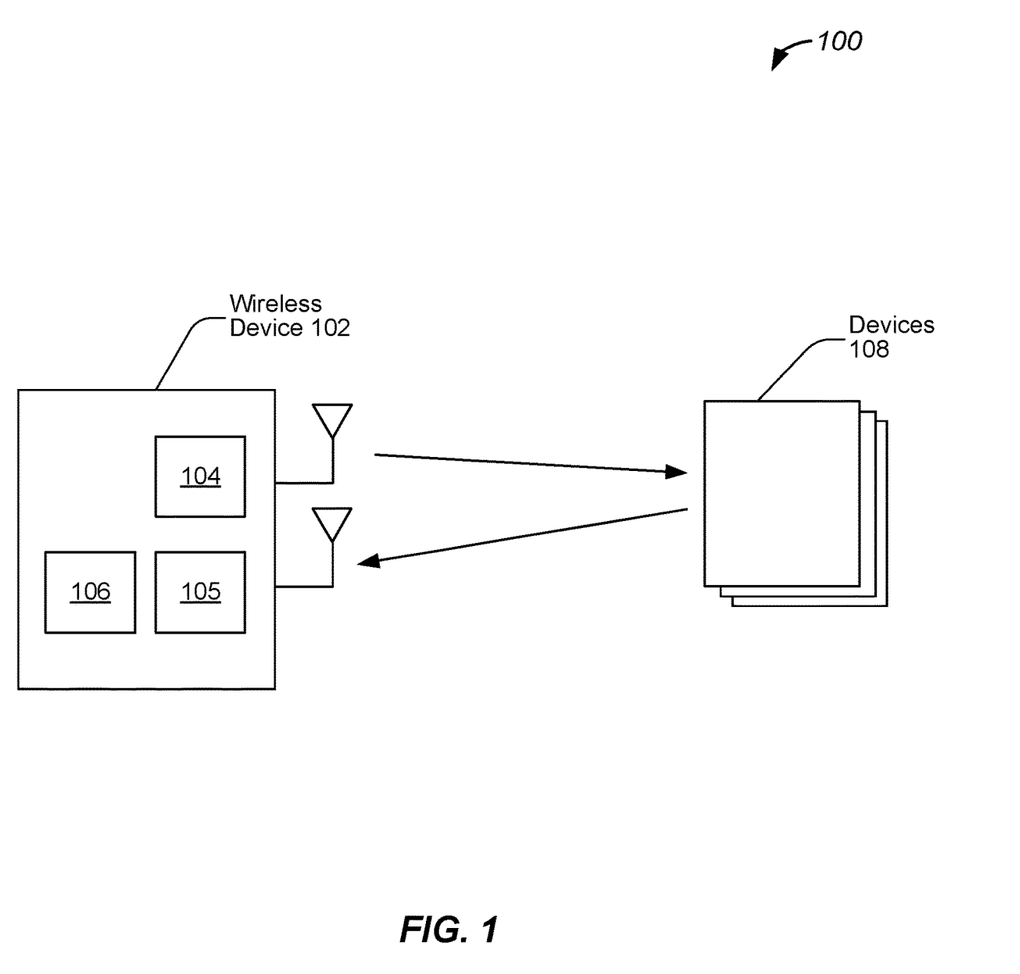
FIG. 1 illustrates an example of a system for radio frequency identification device detection, configured in accordance with some embodiments.

FIG. 1 illustrates an example of a system for radio frequency identification device detection, configured in accordance with some embodiments. Accordingly, a system, such as system 100, may include wireless devices that are used for wireless communications, and are also configured to be able to perform detection and identification operations. Accordingly, as will be discussed in greater detail below, wireless devices included in system 100 may be configured to toggle between communications operations and RFID operations, thus enabling a wireless communications radio to be used for both sets of operations, and also allowing such operations to be seamlessly interleaved.

In some embodiments, system 100 includes wireless device 102 which is configured to transmit and receive wireless signals in accordance with one or more communications protocols. For example, wireless device 102 may include one or more transceivers, such as transceiver 104 and transceiver 105, which are configured to transmit and receive signals in accordance with a wireless communications protocol, such as a Wi-Fi protocol. In various embodiments, wireless device 102 additionally includes a processing device, such as processing device 106, which is configured to implement various hardware and logic associated with transceiver 104 and the wireless communications protocol. For example, processing device 106 may be configured to implement a medium access control (MAC) layer that is configured to control hardware associated with a wireless transmission medium, such as that associated with a Wi-Fi transmission medium. Accordingly, wireless device 102 is configured transmit wireless signals via one or more antennas, and also receive signals via the one or more antennas.

Figure 4A:
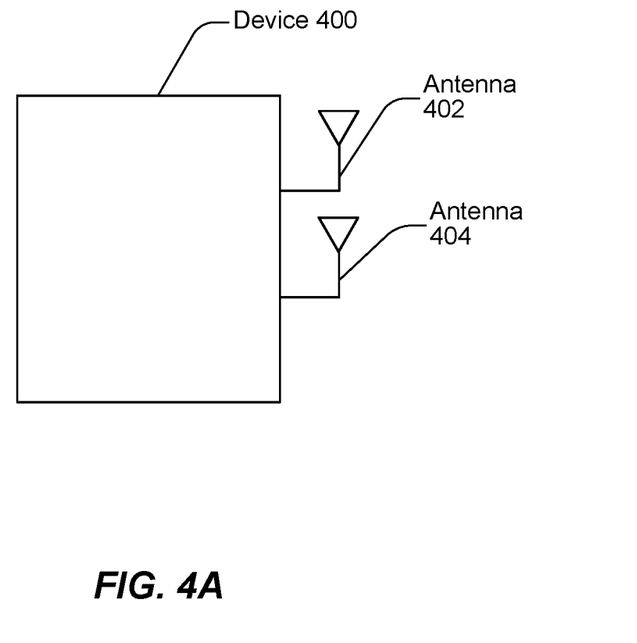
FIG. 4A illustrates an example of a radio frequency identification device, configured in accordance with some embodiments.

System 100 additionally includes one or more devices, such as device 108. As will be discussed in greater detail below, device 108 may be an RFID device that is configured to modulate a received signal based on one or more designated parameters, and return a modulated signal. As will be discussed in greater detail below, device 108 may be an RFID device that includes one or more electromagnetically coupled structures, such as resonators, configured in accordance with one or more resonance parameters. Accordingly, the resonators may be configured to resonate at particular frequencies, and also change in response to one or more environmental changes. In some embodiments, the resonance parameters and characteristics of the resonators may be configured based on a physical geometry and/or configuration of the resonators that affects the resonance characteristics of the resonators. More specifically, resonators may be metal strips having geometries, such as overlapping layers, that create resonances at particular frequencies. Accordingly, particular physical configurations as well as material compositions may be used to configure an electromagnetically coupled structure to have a designated resonant frequency. Additional details regarding such resonance parameters are discussed in greater detail below with reference to FIG. 4. As will also be discussed in greater detail below, device 108 may be included in a system component, and provide sensing information based on environmental changes in such a system component. In this way, additional sensing information may be provided from device 108 to wireless device 102.

As will also be discussed in greater detail below, wireless device 102 may be configured to utilize wireless communications signals to perform RFID detection and identification operations for device 108. For example, wireless device 102 may use a Wi-Fi transceiver to perform such perform RFID detection and identification operations. In this way, wireless device 102 may use components of a Wi-Fi radio, such as a Wi-Fi transceiver, to toggle between communications operations and RFID detection and identification operations.

Moreover, as will also be discussed in greater detail below, RFID detection operations can be performed separately, or combined for multiple different sensing applications. For example, touch sensing, liquid level detection, temperature detection, humidity detection, moisture and pressure detection, and/or mechanical strain detection may be performed based on detection of changing resonance frequency or amplitude characteristics of sensing elements, such as resonators. In this way, multiple different sensing operations may be performed with RFID detection operations and their associated hardware. Additional details regarding such operations are discussed in greater detail below.

Figure 2:
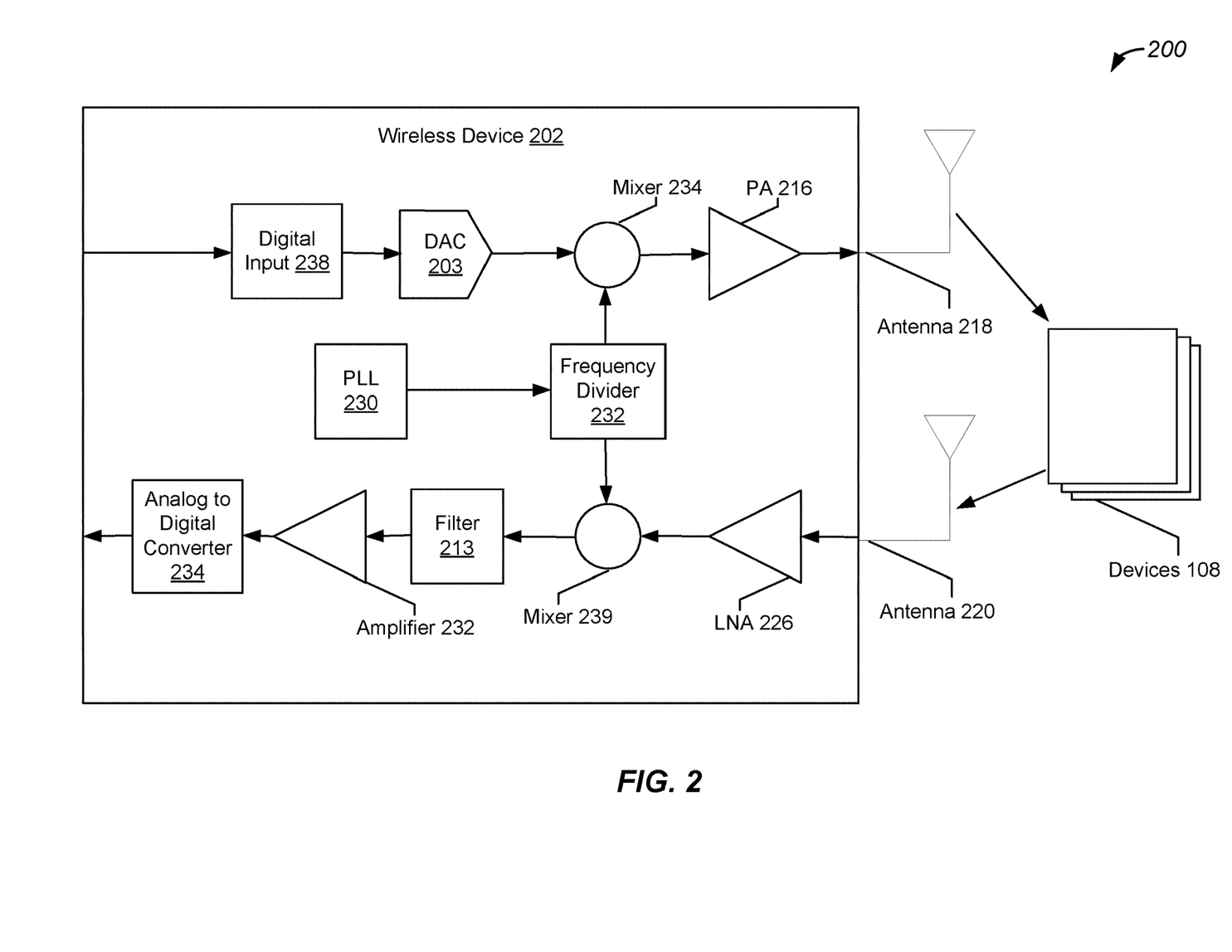
FIG. 2 illustrates an example of another system for radio frequency identification device detection, configured in accordance with some embodiments.

FIG. 2 illustrates an example of another system for radio frequency identification device detection, configured in accordance with some embodiments. As similarly discussed above, a system, such as system 200, may include wireless devices that are used for wireless communications, and are also configured to be able to perform detection, identification, and sensing operations. Accordingly, as will be discussed in greater detail below, wireless devices included in system 200 may be configured to enable seamless interleaving of communications operations and RFID operations.

As similarly discussed above, system 200 may include a wireless device, such as wireless device 202 that is configured to transmit and receive data in accordance with one or more wireless communications protocol. Accordingly, wireless device 202 may include digital input 238 which may provide digital data to be transmitted. Such data may be received from other components of wireless device 202, such as a first transceiver generating a data stream in accordance with a wireless communications protocol, such as a Wi-Fi protocol. An output of digital input 238 may be provided to digital to analog converter (DAC) 203, and then to power amplifier (PA) 216 via mixer 234 for transmission via antenna 218. In some embodiments, digital input 238, DAC 203, mixer 234, and PA 216 are part of a transmit chain included in the first transceiver.

Wireless device 202 may also include one or more components for receiving signals. For example, a signal may be received via antenna 220, provided to low noise amplifier 226, then provided to mixer 239, and provided to filter 213. As will be discussed in greater detail below, mixer 239 may be configured to remove carrier signal component from the received signal. This can be done because wireless device 202 include a phase locked loop circuit such as PLL 230 coupled to frequency divider 232. In various embodiments, filter 213 may be a low pass filter that then provides a signal to amplifier, 232, and to analog to digital converter (ADC) 234. ADC 234 may then provide the received signal to a second transceiver. In some embodiments, low noise amplifier 226, mixer 239, filter 213, amplifier 232, and analog to digital converter 234 are part of a receive chain included in the second transceiver.

As similarly discussed above, RFID devices, such as device 108, are configured to return a signal in accordance with one or more resonance parameters. Accordingly, device 108 may generate a signal using one or more resonators. More specifically, wireless device 202 may transmit a signal as discussed above, and device 108 may reflect a signal back to wireless device 202 based on a signal generated by the one or more resonators included in device 108. In this way, the first transceiver may be configured to transmit a signal, and the second transceiver may be configured to receive a signal reflected from device 108. As will be discussed in greater detail below, wireless device 202 may be configured to extract data values based on such modulation, and perform one or more RFID operations based on such modulation. In some embodiments, wireless device 202 may be configured to determine identifiers for device 108. Moreover, wireless device 202 may also be configured to extract sensing information from the signal reflected from device 108.

Figure 3:
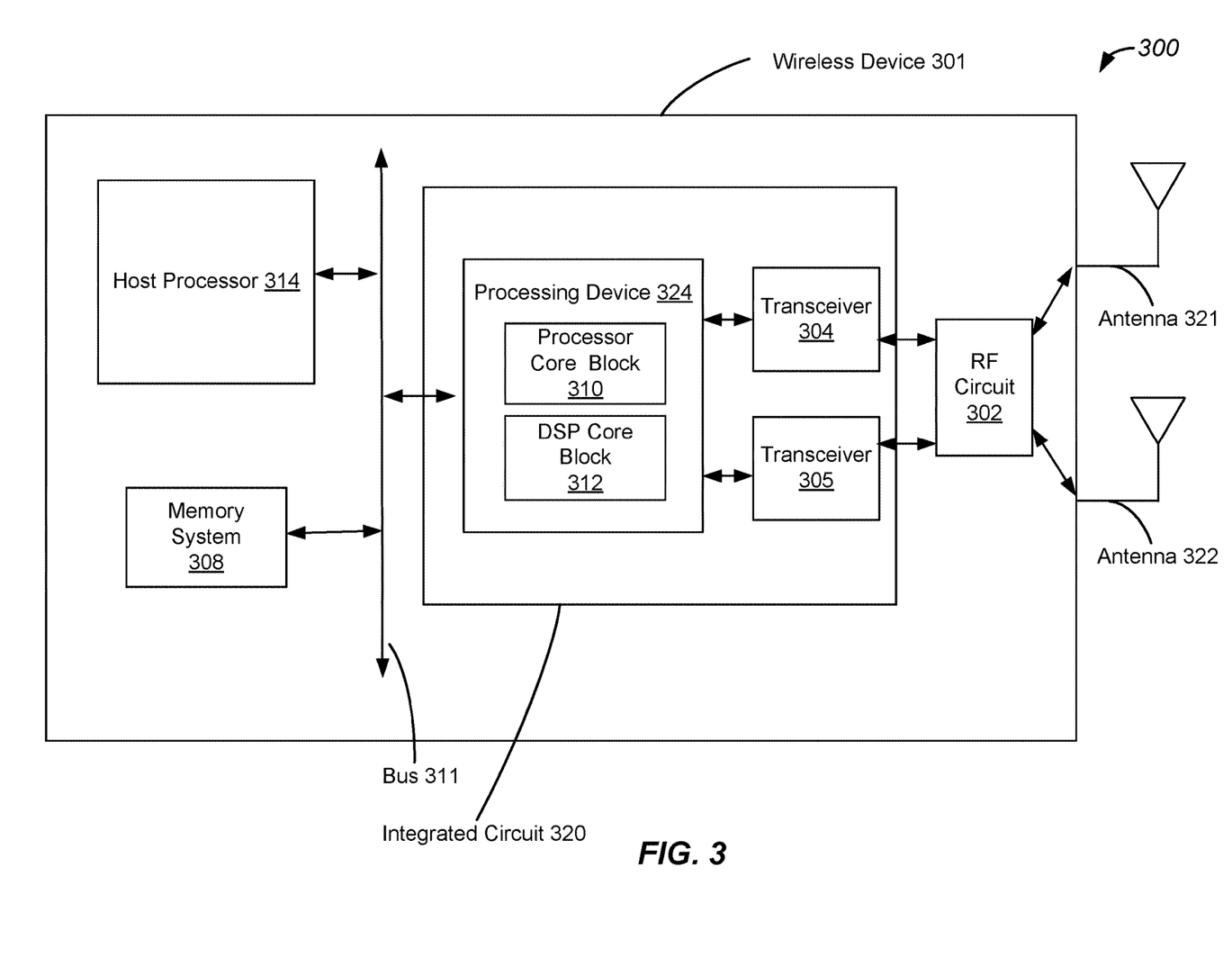
FIG. 3 illustrates an example of a device for radio frequency identification device detection, configured in accordance with some embodiments.

FIG. 3 illustrates an example of a device for radio frequency identification device detection, configured in accordance with some embodiments. More specifically, FIG. 3 illustrates an example of a system, such as system 300, that may include wireless device 301. It will be appreciated that wireless device 301 may be one of any of the wireless devices discussed above with reference to FIGS. 1, 2, and 3, such as wireless device 102 and wireless device 202.

In various embodiments, wireless device 301 includes one or more transceivers, such as transceiver 304 and transceiver 305. In one example, system 300 includes transceiver 304 which is configured to transmit and receive signals using a communications medium that may include antenna 321 or antenna 322. As noted above, transceiver 304 may be a Wi-Fi transceiver. Accordingly, transceiver 304 may be compatible with a Wi-Fi communications protocol, such as an 802.11ax protocol. In various embodiments, transceiver 304 includes a modulator and demodulator as well as one or more buffers and filters, that are configured to generate and receive signals via antenna 321 and/or antenna 322.

System 300 additionally includes transceiver 305 which may be collocated with transceiver 304 in wireless device 301. In various embodiments, transceiver 305 is also be configured to transmit and receive signals using a communications medium that may include antenna 321 or antenna 322. Accordingly, transceiver 305 may be also Wi-Fi transceiver compatible with a Wi-Fi communications protocol. Moreover, transceiver 305 includes a modulator and demodulator as well as one or more buffers and filters, that are configured to generate and receive signals via antenna 321 and/or antenna 322. While various embodiments are described with reference to a Wi-Fi communications protocol, it will be appreciated that any suitable protocol may be used.

In various embodiments, transceivers 304 and 305 may be configured to perform the RFID scanning and sensing operations discussed above and discussed in greater detail below. In one example, transceiver 304 may be configured as a transmitter, and transceiver 305 may be configured as a receiver. Accordingly, as will be discussed in greater detail below, signals may be transmitted from transceiver 304, returned form an RFID device, and received at transceiver 305. Moreover, transceivers 304 and 305 may toggle between such RFID scanning and sensing operations, and wireless communications operations such as data packet transmission and reception. In this way, transceivers 304 and 305 and their associated processing logic may be configured to seamlessly transition between such functionalities.

In various embodiments, system 300 further includes one or more processing devices, such as processing device 324 which may include logic implemented using one or more processor cores. Accordingly, processing device 324 is configured to implement logic for RFID scanning and sensing operations, as will be discussed in greater detail below. For example, processing device 324 may be configured to perform signal generation and sampling operations for RFID scanning, as well as extraction and/or determination of sensing information. Accordingly, processing device 324 includes processing elements configured to perform the RFID scanning and sensing operations that will be described in greater detail below.

Processing device 324 includes one or more components configured to implement a media access control (MAC) layer that is configured to control hardware associated with a wireless transmission medium, such as that associated with a Wi-Fi transmission medium. In one example, processing device 324 may include processor core block 310 that may be configured to implement a driver, such as a Wi-Fi driver. Accordingly, processing device 324 may include components associated with transceiver 304, such as MAC layers, packet traffic arbiters, and a scheduler. In various embodiments, processing device 324 may further include digital signal processor (DSP) core block 312 which may be configured to include microcode.

System 300 further includes radio frequency (RF) circuit 302 which is coupled to antenna 321 and antenna 322. In various embodiments, RF circuit 302 may include various components such as an RF switch, a diplexer, and a filter. Accordingly, RF circuit 302 may be configured to select an antenna for transmission/reception, and may be configured to provide coupling between the selected antenna, such as antenna 321 or antenna 322, and other components of system 300 via a bus, such as bus 311. While one RF circuit is shown, it will be appreciated that wireless device 301 may include multiple RF circuits. Accordingly, each of multiple antennas may have its own RF circuit. Moreover, each one may be associated with a particular wireless communications protocol, such as a first antenna and RF circuit for Wi-Fi and a second antenna and RF circuit for Bluetooth. Moreover, while FIG. 3 illustrates system 300 as having multiple antennas, it will be appreciated that system 300 may be implemented with a single antenna.

System 300 includes memory system 308 which is configured to store one or more data values associated with RFID scanning and sensing operations discussed in greater detail below. Accordingly, memory system 308 includes storage device, which may be a non-volatile random-access memory (NVRAM) configured to store such data values, and may also include a cache that is configured to provide a local cache. In some embodiments, memory system 308, is optional, and is not used to store bits associated with scanning operations. For example, resonators may be configured to have reference resonances. Moreover, when an RFID device is stationary and located near wireless device 202, changes in the reference resonances can be identified based on scanning operations. According to some embodiments, storing of identifier bits may be used when multiple RFID devices are present, or the location and/or distance of an RFID device is variable. In various embodiments, system 300 further includes host processor 314 which is configured to implement processing operations implemented by system 300.

It will be appreciated that one or more of the above-described components may be implemented on a single chip, or on different chips. For example, transceiver 304, transceiver 305, and processing device 324 may be implemented on the same integrated circuit chip, such as integrated circuit chip 320. In another example transceiver 304, transceiver 305, and processing device 324 may each be implemented on their own chip, and thus may be disposed separately as a multi-chip module or on a common substrate such as a printed circuit board (PCB). It will also be appreciated that components of system 300 may be implemented in the context of a vehicle such as an automobile. Accordingly, some components, such as integrated chip 320, may be implemented in a first location, while other components, such as antenna 321 and/or antenna 322, may be implemented in second location, and coupling between the two may be implemented via a coupler.

FIG. 4A illustrates an example of a radio frequency identification device, configured in accordance with some embodiments. As discussed above, RFID devices may include various components configured to generate a signal that is reflected to a wireless device. Moreover, electromagnetically coupled shapes, such as specifically configured stripes, may be used as antennas included in such RFID devices, which may be chipless RFID devices. For example, an RFID device, such as device 400, may include multiple antennas, such as antenna 402 and antenna 404, where one or more antennas, such as antenna 404, may be configured as a conductive shape (e.g. metal stripe) are electromagnetically coupled. In some embodiments, placing such structures statically such that they are a relatively constant distance from a reading device enables simplification of scanning and identification operations. Accordingly, in some embodiments, relatively few, and possibly one, reference resonators are included in an RFID device and used for measurement of environmental properties.

As will be discussed in greater detail below with reference to at least FIG. 4B, an RFID device may include various resonators that may be coupled to an antenna. Such resonators may have different physical configurations, and thus, different resonance characteristics. In this way, the resonators may be configured to interact with a signal transmitted from the wireless device, and collectively reflected a signal having resonance characteristics unique for that particular RFID device.

Figure 4B:
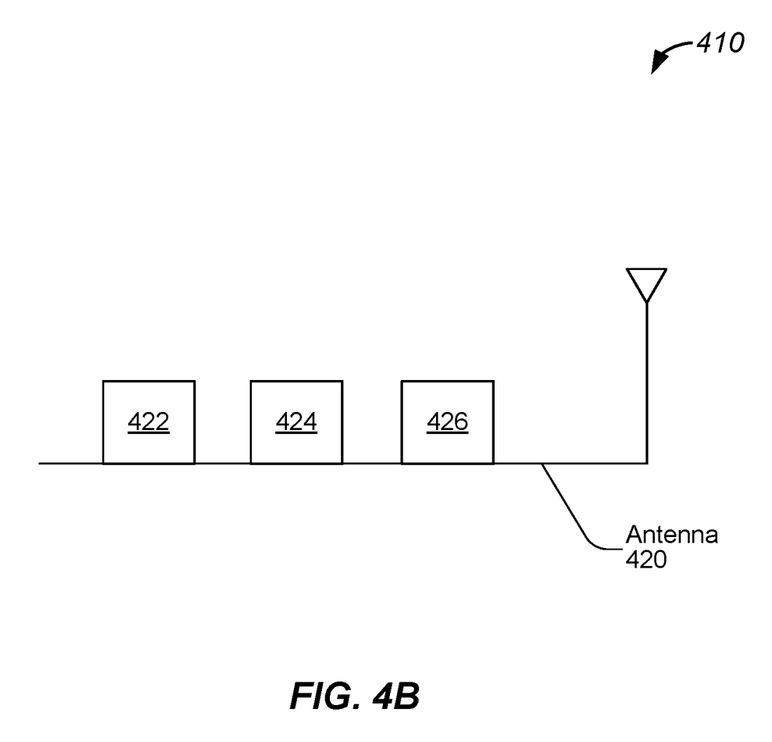
FIG. 4B illustrates another example of a radio frequency identification device, configured in accordance with some embodiments.

FIG. 4B illustrates an example of a radio frequency identification device, configured in accordance with some embodiments. More specifically, FIG. 4B shows a cross-section of device 410 multiple resonators, such as resonators 422, 424, and 426, which may be implemented as metal strips that may have a coiled geometry, thus including a space or internal volume that may include a dielectric material. Such a geometry may configure a metal strip to resonate at a particular frequency. Moreover, differences in sizes of the strips, and/or the volume of the internal space, may cause the strips to resonate at different frequencies from each other as well as different amplitude. Accordingly, by varying the physical parameters of the geometries of the resonators, an entity, such as a manufacturer may configure device 410 to have a particular set of resonance parameters, and to reflect a signal having a designated set of frequencies and associated amplitudes. As discussed above, the resonators may be coupled to an antenna, and may transmit a signal via the antenna.

In various embodiments, the resonance characteristics of the resonators may be sensitive to one or more environmental or operational changes. For example, device may be included in a larger system component, such as a touch panel or other component of an operational environment such as an infotainment system of an automobile. In various embodiments, one or more operational parameters of a resonator may change in response to a chance in such an operational environment. In one example, a dielectric permittivity of a resonator may change in response to a change such as a change in humidity or temperature, or a physical deformation due to pressure from a touch from an entity, such as a user. Such changes may cause the signal generated by the resonator to change, and the signal generated by device 410 may also change. As will be discussed in greater detail below, such changes may be detected and identified by a wireless device. In this way, sensing information may be conveyed from device 402 to a wireless device.

FIG. 4B illustrates another example of a radio frequency identification device, configured in accordance with some embodiments. As discussed above, various resonators may be coupled to or included in an antenna. More specifically, an antenna, such as antenna 420, may be coupled to or integrated with one or more resonators, such as resonator 422, resonator 424, and resonator 426. In some embodiments, the resonators may have different configurations based on their respective functions. For example, resonator 422 and resonator 424 may be resonators as discussed above with reference to FIG. 4A.

Moreover, in some embodiments, one or more resonators, such as resonator 426, may be a reference resonator. Accordingly, resonator 426 may be configured such that it is not sensitive to the environmental parameter that resonators 422 and 424 are configured to be sensitive to. In this way, resonators 422 and 424 may be sensitive to the environmental parameter, and resonator 426 is not and is configured as a reference signal. Accordingly, spectral peaks associated with resonators 422 and 424 may shift based on changes to the environmental parameter while a spectral peak associated with resonator 426 does not.

Figure 4C:
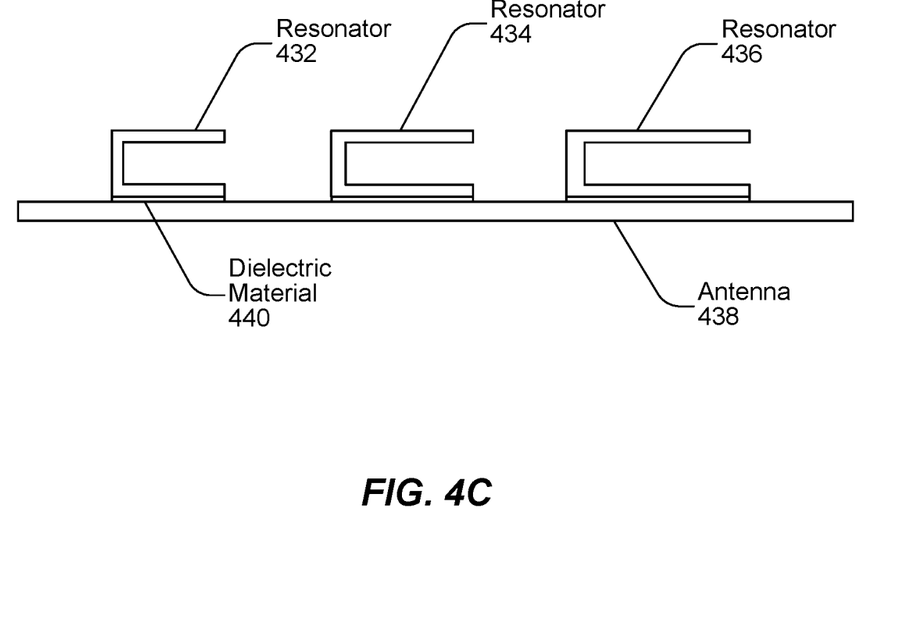
FIG. 4C illustrates yet another example of a radio frequency identification device, configured in accordance with some embodiments.

FIG. 4C illustrates yet another example of a radio frequency identification device, configured in accordance with some embodiments. In various embodiments, resonators, such as resonator 432, resonator 434, and resonator 436, may be configured to be U-shaped resonators that may be implemented with an antenna, such as antenna 438. In one example, antenna 438 may be a dipole antenna. Moreover, resonator 432, resonator 434, and resonator 436 may be mechanically coupled to antenna 438 via a material, such as dielectric material 440. In various embodiments, resonators 432, 434, and 436 are configured to change resonance properties in response to changes in dielectric properties of their substrate or an environment in which the resonators are implemented. In some embodiments, resonators 432, 434, and 436 may by covered by a material that is configured to be sensitive to a particular environmental parameter of interest, such as a carbon monoxide (CO) level that may be present in ambient air. Accordingly, resonators 432, 434, and 436 may be coated in materials sensitive to specific environmental parameters, and the materials may be configured to facilitate changes in resonance based on the presence of those environmental parameters.

Figure 4D:
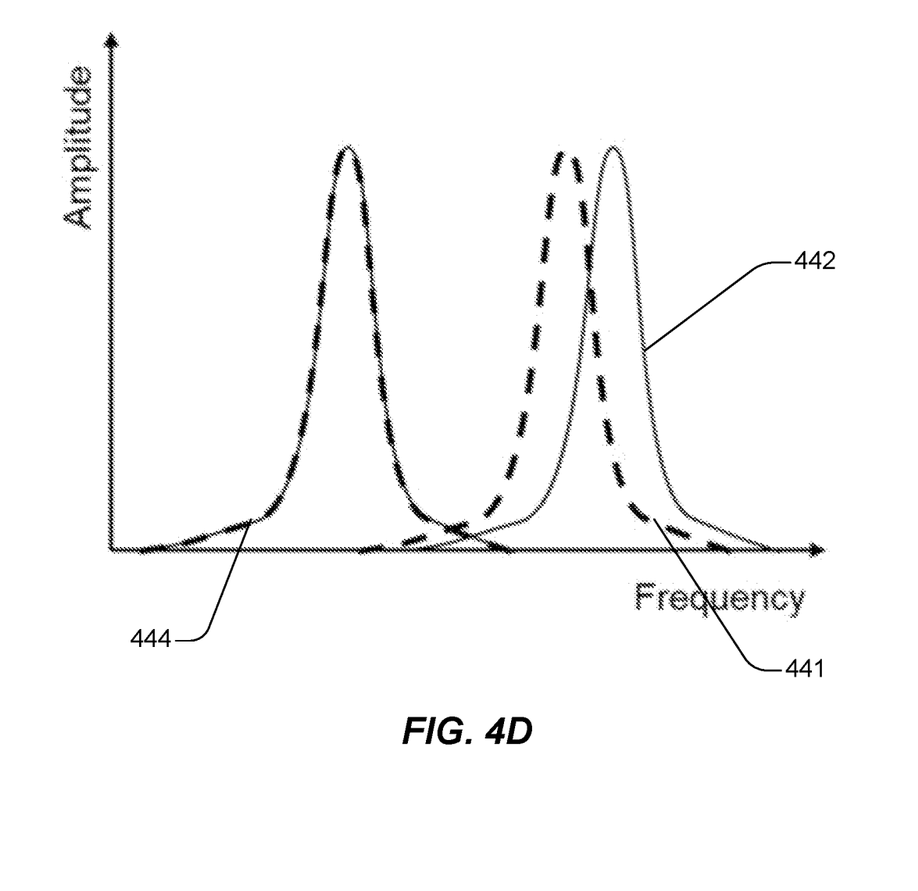
FIG. 4D illustrates an example of a diagram of resonance responses, implemented in accordance with some embodiments.

FIG. 4D illustrates an example of a diagram of resonance responses, implemented in accordance with some embodiments. As similarly discussed above, sensing operations may detect changes based on a comparison of measured resonances to a reference resonance. In one example, the reference resonance may be a stored reference value taken during a calibration operation and may be stored as a calibration value. Such a calibration value may be subtracted from a measured change in a sensing resonance, and the calibrated measured change may be mapped to an environmental change, as discussed in greater detail below. In another example, the reference value may be obtained from separate resonators not coated in a material sensitive to environmental parameters.

As discussed above, an environmental change may be measured based on a change in a sensed resonance. Accordingly, a sensing resonance may be measured and stored as measurement data that is used to detect changes in an environmental parameter that is being measured. Moreover, when a reference resonator is used a resonance of the reference resonator does not change as a result of changes in the environmental parameter.

As shown in FIG. 4D, a change in an environmental parameter may cause a change in behavior of a sensing resonator, as shown by waveform 441 and waveform 442, where waveform 441 is a measurement taken before the environmental change, and waveform 442 is a measurement taken after the environmental change. In this example, waveform 444 represents a measurement from a reference resonator. As shown in FIG. 4D, waveform 444 has not changed. In some embodiments, an environmental change may be measured based on a comparison of the change in the reference waveform, and the change in the sensing waveform, as determined by shifts in peaks of resonances. For example, a shift in the reference waveform may be subtracted from a shift in the sensing waveform to determine a calibrated resonance shift for the sensed environmental change.

In some embodiments, such calculated shifts in resonances may be mapped to a change in an environmental parameter. More specifically, a data table stored in memory may be configured to map shifts in resonance peaks to changes in an environmental parameter. In one example, increments in spectral or frequency shifts may be mapped into increments in a change in an environmental parameter, such as a change in CO concentration in an ambient atmosphere. Such a data table may have been previously generated by an entity, such as a manufacturer, during testing and calibration operations that may have been performed previously.

In some embodiments, a reference resonator that is implemented as a separate resonator may be included in a separate RFID device. Moreover, storing bits of data may be performed based on reference resonances. Accordingly, such reference bits may be used to identify several different chipless RFID devices or to detect arbitrarily located RFID devices that may vary in distance from a reader. In some embodiments, the resonance frequencies of sensing resonators are separate from and do not overlap resonance frequencies of the reference resonators and their associated bits.

Figure 5:
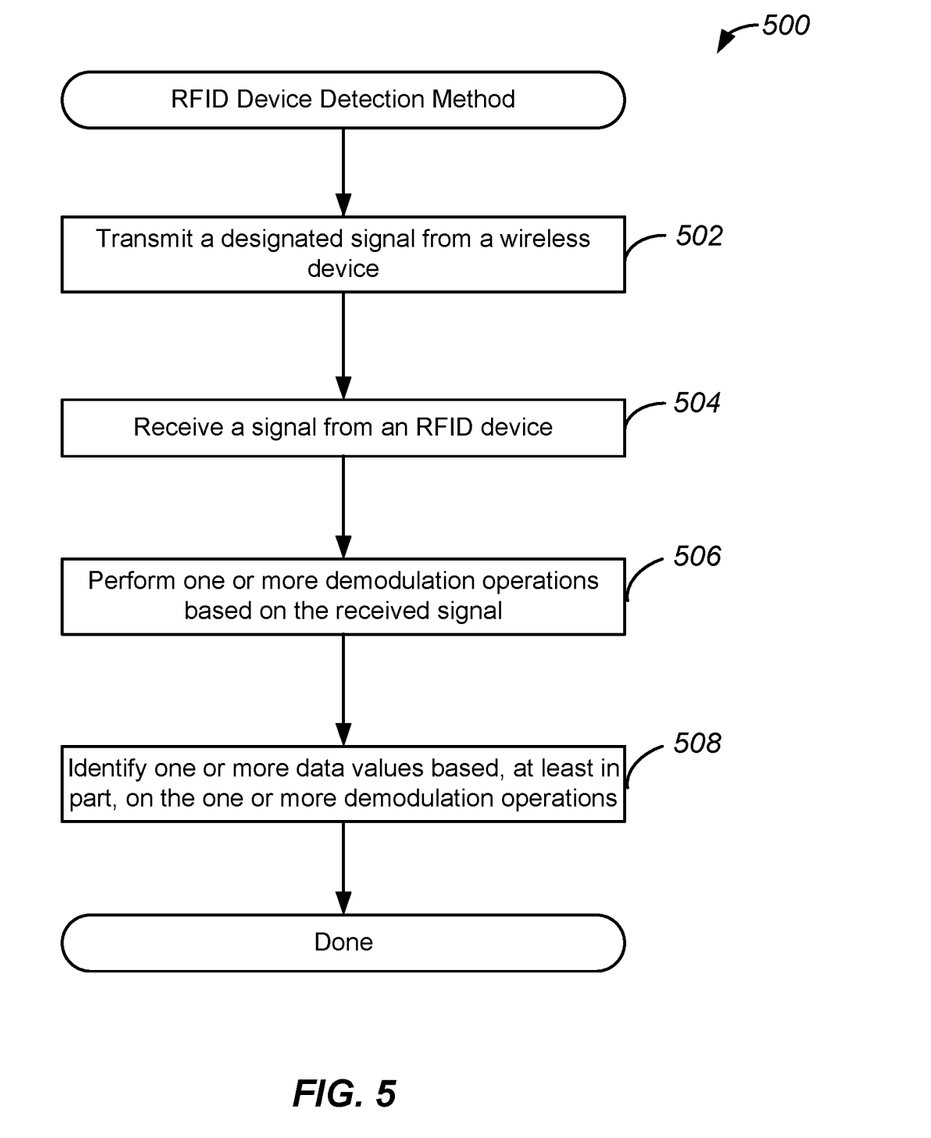
FIG. 5 illustrates a flow chart of an example of a method for radio frequency identification device detection, implemented in accordance with some embodiments.

FIG. 5 illustrates a flow chart of an example of a method for radio frequency identification device detection, implemented in accordance with some embodiments. As will be discussed in greater detail below, a method, such as method 500, may be performed to configure a wireless device to perform RFID device scanning and sensing operations. As similarly discussed above, the wireless device may be compatible with a wireless communications protocol, such as an Institute of Electrical and Electronics Engineers (IEEE) 802.11 protocol, and transmit a signal using a wireless local area network (WLAN) frequency range, receive a signal from an RFID device, and perform one or more identification and sensing operations based on the received signal. In this way, a Wi-Fi wireless device may be configured to perform RFID scanning and sensing operations.

Method 500 may perform operation 502 during which a designated signal may be transmitted from a wireless device. As similarly discussed above, the designated signal may be a predetermined signal that has been defined by an entity, such as a manufacturer. Accordingly, the designated signal may be a defined or arbitrary data pattern configured to include a known data transmission having known frequency characteristics. Accordingly, during operation 502, a first transceiver of the wireless device may be configured as a transmitter, and may transmit the designated signal via a transmission medium.

Method 500 may perform operation 504 during which a signal may be received from an RFID device. Accordingly, as similarly discussed above, the signal may be received at the RFID device, and the RFID device may reflect a signal back in accordance with one or more resonance parameters. As also discussed above, such resonance parameters may be determined based on physical characteristics, such as a physical configuration and geometry as well as material properties and compositions, of resonators included in the RFID device. Accordingly, the RFID device may reflect a signal to the wireless device based on resonance characteristics of the resonators. As also discussed above and as will be discussed in greater detail below, the signal may also be affected by operational/environmental parameters of the resonators.

Method 500 may perform operation 506 during which one or more demodulation operations may be performed. Accordingly, a second transceiver of the wireless device may be configured as a receiver, and may receive the signal backscattered from the RFID device. The second transceiver may perform one or more demodulation operations to recover encoded data from the received signal. As will be discussed in greater detail below, such demodulation operations may include obtaining a plurality of samples and performing one or more decoding operations.

Method 500 may perform operation 508 during which one or more data values may be identified based, at least in part, on the one or more demodulation operations. Accordingly, the received signal may be demodulated and decoded to extract one or more data values from the received signal. As similarly discussed above, the data values and extracted information may identify resonance frequencies of the signal received from the RFID device. In this way, the wireless device may identify resonance parameters of the RFID device based on the received signal. Moreover, the wireless device may also perform distance estimation computations based on timestamps and time-of-arrival computations associated with the received signal.

As will be discussed in greater detail below, extracted information from the received signal may also include measurement data received from resonators included in the RFID device. More specifically, relative amplitudes of transmitted and reflected signals may be compared for a particular distance between the wireless device and the RFID device. For example, a signal having in-phase quadrature (IQ) components may be transmitted from the wireless device, and received, via backscattering, from the RFID device. The received signal has a common gain resulting from a distance and relative gain in spectrum caused by resonators. Such spectra may be calculated using a fast Fourier transform (FFT), and differences and shifts in the spectra may be calculated based on comparisons of the received signal to reference signals. The determined differences may be compared against designated threshold values to determine if a sufficient change in environmental parameter has been detected. Such designated thresholds may be determined by an entity, such as a manufacturer.

Figure 6:
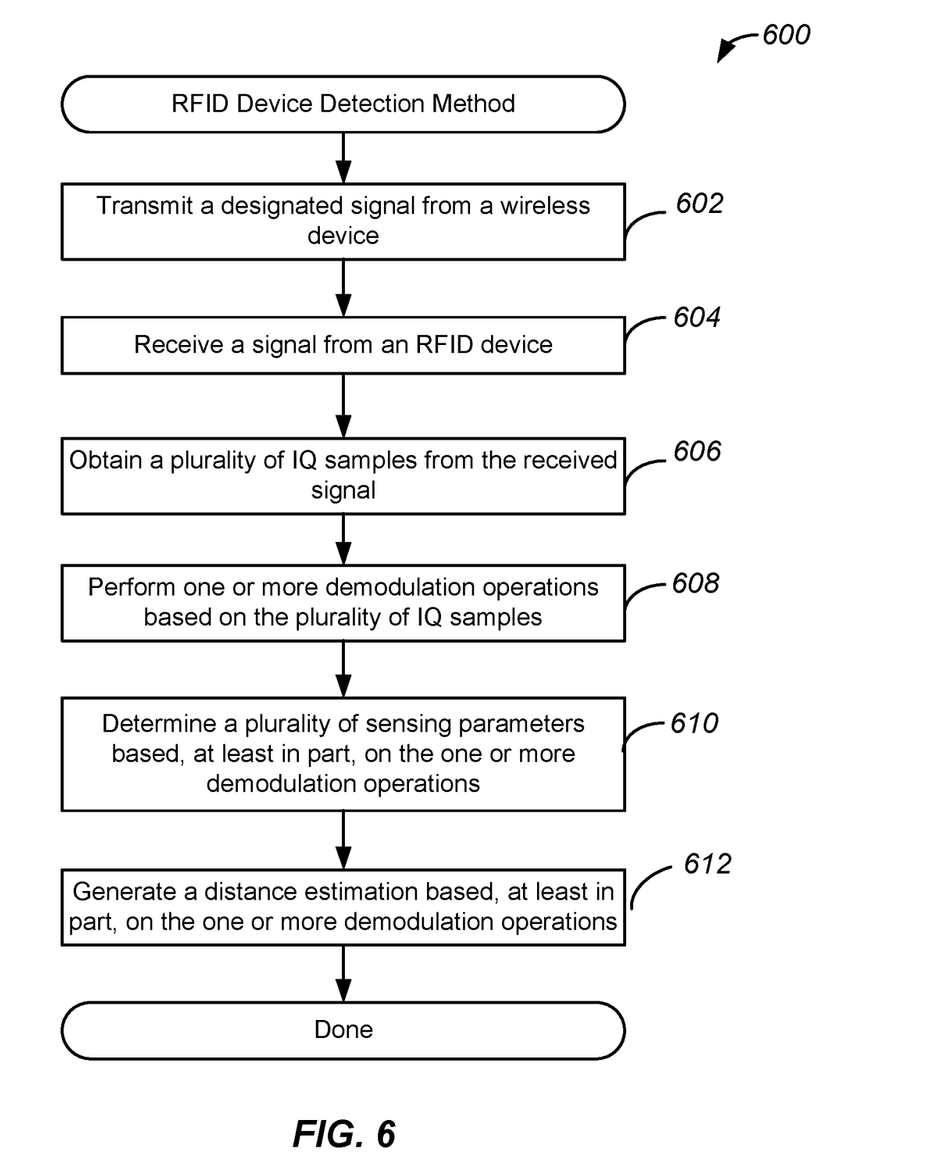
FIG. 6 illustrates a flow chart of another example of a method for radio frequency identification device detection, implemented in accordance with some embodiments.

FIG. 6 illustrates a flow chart of another example of a method for radio frequency identification device detection, implemented in accordance with some embodiments. As similarly discussed above, a method, such as method 600, may be performed to configure a wireless device to perform RFID device scanning and sensing operations. Accordingly, as will be discussed in greater detail below, the wireless device may use two collocated transceivers to transmit and receive signals as well as obtain various samples and measurements that may be used for RFID identification and sensing operations.

Method 600 may perform operation 602 during which a designated signal may be transmitted from a wireless device. As similarly discussed above, the designated signal may be a predetermined signal that has been defined by an entity, such as a manufacturer. Accordingly, the designated signal may include a predetermined bit stream, and thus may include a known data pattern to the wireless device. The bit stream may be configured in accordance with a wireless communications protocol, and may have known frequency characteristics. Accordingly, during operation 602, a first transceiver of the wireless device may be configured as a transmitter, and may transmit the designated signal via a transmission medium.

Method 600 may perform operation 604 during which a signal may be received from an RFID device. As similarly discussed above, the signal may be received at the RFID device, and the RFID device may reflect a signal in accordance with one or more resonance parameters. As also discussed above, such resonance parameters may be determined based on physical characteristics, such as a physical configuration and geometry, of resonators included in the RFID device and environment sensing elements in the RFID. Accordingly, the RFID device may reflect a signal to the wireless device based on resonance behavior of the resonators.

Method 600 may perform operation 606 during which a plurality of IQ samples may be obtained from the received signal. Accordingly, a receiver of the wireless device may include an IQ capture unit that is configured to sample the received signal at a designated sampling frequency, and is further configured to obtain a plurality of measurements based on such samples. In various embodiments, the measurements may be IQ samples configured to measure in-phase and quadrature components of the received signal. The IQ samples may be stored in memory for subsequent processing operations, as will be discussed in greater detail below.

Method 600 may perform operation 608 during which one or more demodulation operations may be performed based on the plurality of IQ samples. In various embodiments, the demodulation operations may be performed in accordance with demodulation operations defined by a wireless communications protocol, and as performed by the PHY layer configured in accordance with the wireless communications protocol. Accordingly, the demodulation operation used to process the IQ samples may defined by a wireless communications protocol, such as a Wi-Fi protocol. It will be appreciated that any suitable demodulation technique may be used in accordance with any defined modulation/demodulation scheme.

Method 600 may perform operation 610 during which a plurality of data values may be determined based, at least in part, on the one or more demodulation operations. Accordingly, as similarly discussed above, the received signal may be demodulated and decoded to extract one or more data values from the received signal. As similarly discussed above, the received signal may include multiple frequency components determined based on the resonators included in the RFID device, and the demodulation operations may be performed to, among other things, extract frequency information from the received signal and identify the resonance frequency components.

Accordingly, during operation 610, sensing parameters may be determined. In one example, sensing parameters may identify sensing information associated with the RFID device from which the signal was received. More specifically, the sensing parameters may identify one or more changes in the identified resonance frequency components, and the changes may be used to identify one or more sensed conditions or changes. For example, the frequency information extracted during operation 608 may be compared with previously stored frequency information which may have been obtained during a previous iteration of method 600. One or more changes may be identified based on the comparison, such as an attenuation or an increase in one or more frequency components. Such identified changes may be mapped to a particular sensed operation or change based on a designated mapping, as may have been previously determined and stored by an entity, such as a manufacturer or user during a configuration process. Accordingly, identified changes in operation of the resonators may be mapped to sense information determined by the wireless device. In this way, the wireless device may receive sensing information from the RFID device that may be embedded in or coupled to another system component, such as a touch panel.

As discussed above, resonance characteristic changes may be caused by touches to a touch panel or accumulation of moisture in the RFID device. Accordingly, resonators or conductive stripes that are included in the RFID device and are placed in an operational environment have resonant frequencies that may be dependent on that operational environment. If the operational environment changes, as may occur when a finger that has a high complex dielectric permittivity is near a resonator, it coupling with the resonator, may cause a resonant frequency change. In an example of moisture, dielectric permittivity around a resonator increases and thus shifts a resonant response to lower frequencies. As discussed above, such changes may cause shifts in spectra of received signals. Such shifts or differences may be determined based on comparisons of the received spectra with reference spectra, and the differences may be identified as changes in an environment if they exceed a designated threshold.

Method 600 may perform operation 612 during which a distance estimation may be generated based, at least in part, on the one or more demodulation operations. In various embodiments, transceivers of the wireless device may be configured to include time stamp units that monitor when data was transmitted, and when data was received. In some embodiments, the transceivers may be synchronized to the same clock to ensure accuracy and synchronicity of the temporal measurements and determinations.

Accordingly, during operation 612, a transmission time stamp may be obtained from the first transceiver corresponding to the transmission of the designated signal at operation 602. Moreover, a reception time stamp may be obtained from the second transceiver corresponding to the reception of the designated signal at operation 604. The transmission time stamp and the reception time stamp may be used to determine a time of flight. Furthermore, the tine of flight as well as known speed of propagation of the designated signal may be used to estimate a distance to the RFID device and generate an estimated distance value.

Figure 7:
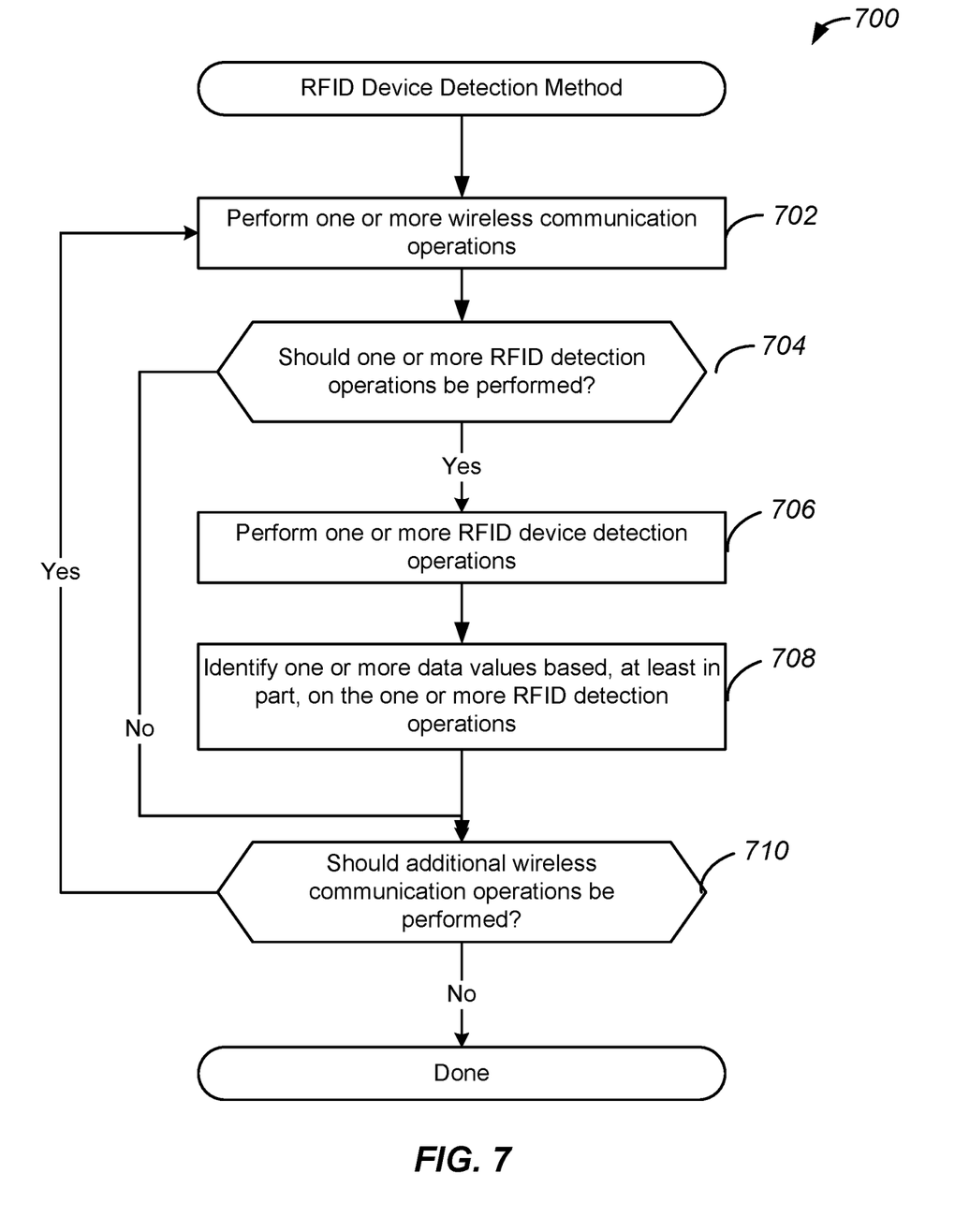
FIG. 7 illustrates a flow chart of an additional example of a method for radio frequency identification device detection, implemented in accordance with some embodiments.

FIG. 7 illustrates a flow chart of an additional example of a method for radio frequency identification device detection, implemented in accordance with some embodiments. As similarly discussed above, a method, such as method 700, may be performed to configure a wireless device to perform RFID device scanning and sensing operations. As similarly discussed above, the wireless device may be configured to perform wireless communication in accordance with a wireless communications protocol. Accordingly, as will be discussed in greater detail below, a method, such as method 700 may be performed to seamlessly switch between operational modes. For example, a wireless device may switch between a first operational mode used for wireless communications operations, such as transmission and reception of data packets, and a second operational mode used for RFID scanning operations, such as identification, sensing, and security operations for RFID devices.

Method 700 may perform operation 702 during which one or more wireless communication operations may be performed. As similarly discussed above, the wireless communication operations may include the transmission and reception of data packets in accordance with a wireless communications protocol, such as a Wi-Fi protocol. Accordingly, the wireless device may be in communication with one or more other wireless devices, and during operation 702, data packets and frames may be transmitted and received between the wireless devices over a wireless communications network. Therefore, wireless devices disclosed herein may be configured to perform RFID device scanning and distance estimation operations interleaved with or parallel to data packet transmission operations.

Method 700 may perform operation 704 during which it may be determined if one or more RFID detection operations may be performed. In various embodiments, such a determination may be made based on one or more events or conditions. For example, RFID detection operations may be performed periodically, and may be performed after a designated period of time has elapsed. In some embodiments, RFID detection operations may be performed dynamically, and may be performed in response to the occurrence of one or more events or conditions. For example, another system component, such as an application executed by a host processor, may provide an input that triggers such scanning operations. Thus, RFID detection operations may be triggered in response to an input received from an application that may be requesting such scanning operations. If it is determined that one or more RFID detection operations should not be performed, method 700 may proceed to operation 710. If it is determined that one or more RFID detection operations should be performed, method 700 may proceed to operation 706.

Accordingly, during operation 706, one or more RFID device detection operations may be performed. Accordingly, transceivers of the wireless device may be configured as a transmitter and a receiver, and a designated signal may be transmitted and received as described above. Moreover, various identification, sensing, and estimated distance computations may also be performed. In this way, during operation 706, the wireless device may be configured as an RFID scanner, and one or more RFID device detection and distance operations may be performed to identify an RFID device, and perform security operations associated with the RFID device.

Method 700 may perform operation 708 during which one or more data values may be identified based, at least in part, on one or more RFID detection operations. As similarly discussed above, the one or more data values may be decoded and extracted from the received signal. The extracted data values may also include measurement data, as discussed above. For example, a reflected signal may have been received from resonators included in a touch panel, and one or more spectra shifts and/or difference values may be determined. In this way, the data values may be identified and stored, and utilized for the computations and operations discussed above.

Method 700 may perform operation 710 during which it may be determined if additional wireless communication operations should be performed. In various embodiments, such a determination may be made in response to one or more conditions or events. For example, in response to RFID detection operations completing, the wireless device may, by default, return to wireless communication operations such as the transmission and reception of data packets described above. In another example, the wireless device may return to wireless communication operations in response to the passage of a designated amount of time. If it is determined that additional wireless communication operations should be performed, method 700 may return to operation 702. If it is determined that additional wireless communication operations should not be performed, method 700 may terminate.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   transmitting a signal from a transmitter of a wireless device;
   receiving, using a receiver of the wireless device, a signal from a radio frequency identification (RFID) device, the signal comprising one or more resonance parameters, the transmitter and receiver being configurable to be toggled from a first operational mode used for wireless communications protocol operations to a second operational mode used for RFID scanning operations, wherein the wireless communications protocol operations are used for data transmission over a wireless network and are different than RFID scanning operations; and
   generating sensing information and an estimated distance value based, at least in part, on the received signal, the sensing information representing a sensed condition at the RFID device, and the estimated distance value representing an estimate of a distance between the wireless device and the RFID device.

2. The method of claim 1, wherein the RFID device comprises a plurality of electromagnetically coupled structures each configured to have a designated resonant frequency.

3. The method of claim 2, wherein the signal is generated based on the plurality of electromagnetically coupled structures being coupled to an antenna and interacting with the transmitted signal.

4. The method of claim 2, wherein the plurality of electromagnetically coupled structures comprise a plurality of conductive shapes configured to reflect radio frequency (RF) signals.

5. The method of claim 1 further comprising:
   obtaining a plurality of samples from the received signal; and
   performing one or more demodulation operations based, at least in part, on the plurality of samples.

6. The method of claim 5, wherein the one or more demodulation operations decode the sensing information from the signal, and wherein the sensed condition represents a change in an operational environment of the RFID device.

7. The method of claim 1 further comprising:
   switching the transmitter from the first operational mode to the second operational mode to perform the RFID scanning operations, the first operational mode being used for data transmission in accordance with the wireless communications protocol, and the second operational mode being used for scanning associated with the RFID device.

8. The method of claim 1, wherein the wireless communications protocol is an Institute of Electrical and Electronics Engineers (IEEE) 802.11 protocol.

9. The method of claim 1, wherein the signal is transmitted using a wireless local area network (WLAN) frequency range.

10. A system comprising:
    a transmitter configured to transmit a signal;
    a receiver configured to receive a signal from a radio frequency identification (RFID) device, wherein the transmitter and receiver are configurable to be toggled from a first operational mode used for a wireless communications protocol operations to a second operational mode used for RFID scanning operations, wherein the wireless communications protocol operations are used for data transmission over a wireless network and are different than RFID scanning operations; and
    a processing device coupled to the transmitter and the receiver and configured to:
       generate sensing information and an estimated distance value based, at least in part, on the received signal, the sensing information representing a sensed condition at the RFID device, and the estimated distance value representing an estimate of a distance between a wireless device and the RFID device.

11. The system of claim 10, wherein the RFID device comprises a plurality of electromagnetically coupled structures each configured to have a designated resonant frequency, and wherein the signal is generated based on the plurality of electromagnetically coupled structures being coupled to an antenna and interacting with the transmitted signal.

12. The system of claim 10, wherein the processing device is further configured to:
obtain a plurality of samples from the received signal; and
perform one or more demodulation operations based, at least in part, on the plurality of samples.

13. The system of claim 12, wherein the one or more demodulation operations decode the sensing information from the signal, and wherein the sensed condition represents a change in an operational environment of the RFID device.

14. The system of claim 10, wherein the wireless communications protocol is an IEEE 802.11 protocol.

15. The system of claim 10, wherein the signal is transmitted using a WLAN frequency range.

16. A device comprising:
processing elements configured to:
generate a signal transmitted from a transmitter of a wireless device;
receive, using a receiver of the wireless device, a signal from a radio frequency identification (RFID) device, the transmitter and receiver being configurable to be toggled from a first operational mode used for wireless communications protocol operations to a second operational mode used for RFID scanning operations, wherein the wireless communications protocol operations are used for data transmission over a wireless network and are different than RFID scanning operations; and
generate sensing information and an estimated distance value based, at least in part, on the received signal, the sensing information representing a sensed condition at the RFID device, and the estimated distance value representing an estimate of a distance between the wireless device and the RFID device.

17. The device of claim 16, wherein the RFID device comprises a plurality of electromagnetically coupled structures each configured to have a designated resonant frequency, and wherein the signal is generated based on the plurality of electromagnetically coupled structures being coupled to an antenna and interacting with the transmitted signal.

18. The device of claim 16, wherein the processing elements are further configured to:
obtain a plurality of samples from the received signal; and
perform one or more demodulation operations based, at least in part, on the plurality of samples,
wherein the one or more demodulation operations decode the sensing information from the signal, and wherein the sensed condition represents a change in an operational environment of the RFID device.

19. The device of claim 16, wherein the wireless communications protocol is an IEEE 802.11 protocol.

20. The device of claim 16, wherein the signal is transmitted using a WLAN frequency range.

* * * * *